3,840,515
METHOD OF TREATING GLUTEN
Robert A. Reiners, Hinsdale, John C. Pressick, Clarendon Hills, and Leo Morris, Lincolnwood, Ill., assignors to CPC International Inc.
No Drawing. Filed Feb. 7, 1972, Ser. No. 224,254
Int. Cl. A23j 1/12; C07g 7/00
U.S. Cl. 260—112 G    3 Claims

ABSTRACT OF THE DISCLOSURE

A process for the removal of oil, color and flavor from gluten. The gluten is extracted with methanol in the substantial absence of water. The resulting product is useful as a binder in sausage, weiners and the like. It is useful also in other food materials. It is also useful as a raw material for the extraction of prolamines. Such extraction is effected by means of hot aqueous methanol under pressure.

---

The invention of this application relates to the preparation of relatively oil-free gluten materials. It relates more particularly to such oil-free gluten materials which are also substantially reduced with respect to the color and flavor normally associated with gluten. Still more particularly, it relates to a novel method for the preparation of prolamines from gluten.

Of the three principal classes of foods, i.e., proteins, carbohydrates and fat, proteins constitute the most important class because they provide the amino acids from which body tissues are made. All three classes, of course, are essential, but nature has made starches and fats more easily available than proteins. Shortages of starches and fats are virtually unknown, but there are millions of people in the world who do not ingest sufficient quantities of protein in their diet to maintain normal healthy growth.

The two principal sources of proteins are meats and grains. The former are understandably less plentiful than the latter, but they are also more desirable. The conversion of grain protein to animal protein is expensive, but the enhancement of flavor which accompanies such transformation is sufficient to justify this expense.

One purpose of the invention herein is to upgrade the aesthetic qualities of grain protein so as to render it suitable for incorporation into animal protein in foods, viz, meat. Another purpose of the invention is to make available a new, improved process for the preparation of prolamines from gluten.

The oil content, the color and the flavor of gluten have long been recognized as undesirable components of this proteinaceous material and their removal has generally been accomplished by means of hexane. Originally, zein had been prepared by the aqueous ethyl alcohol extraction of powdered corn. Osborne, in U.S. Pat. 456,773, first suggested the use of corn gluten as a source of zein. He taught the extraction of zein from corn gluten by means of 95% ethyl alcohol. The resulting aqueous ethyl alcohol extract was separated by filtration, then evaporated to dryness to yield the desired zein.

Swallen, U.S. Pat. 2,120,946, discloses a process for the preparation of "relatively concentrated solutions of zein having reduced oil and color content." The process consists in extracting corn gluten with an aqueous mixture of solvents. The mixture includes a lower aliphatic alcohol such as ethyl or methyl alcohol plus an alcohol-miscible solvent for corn oil and coloring matter. This latter alcohol-miscible solvent may be toluene, benzene, xylene, chlorinated hydrocarbons or the like. A typical such aqueous solvent mixture would contain 7-8% of water. The resulting aqueous alcohol extract then is itself extracted with an additional amount of the above alcohol-miscible solvent for corn oil and coloring matter, i.e., toluene, xylene, benzene, etc. The purpose of this second extraction is to remove the oil and coloring matter from the original aqueous alcohol extract. The principal advantage of this method is the considerable savings in alcohol which must be used.

In another patent which issued about the same time, U.S. Pat. 2,133,591, Swallen discloses a quite similar process differing in that the solvent employed in the first extraction step is either a single solvent such as methyl alcohol or a mixture of such alcohols. That is, the first extracting solvent does not contain an oil-extracting solvent such as toluene, benzene or xylene.

Walsh et al., U.S. Pat. 2,360,381, disclose the preparation of zein from corn gluten by means of extraction of the gluten with a 40%–65% aqueous monohydric alcohol solvent. The alcohol "may be methyl, ethyl, the propyl, the butyl, and other appropriate alcohols used singly or in mixtures." The aqueous alcohol extract is cooled so as to effect phase separation between a heavier, relatively zein-rich layer and a lighter, relatively zein-poor layer. The heavier layer is then isolated and freed of solvent by evaporation.

While certain of the above disclosed processes, and many others as well, purportedly result in relatively oil- and color-free products, the oil and color contents of such products still leave something to be desired. Furthermore, the above patents do not refer to the presence in gluten of an undesirable "feedy" flavor. Such flavor has in the past relegated these proteins to chemical uses or animal foods. It is a distinct barrier to their use for human consumption.

It is accordingly a principal object of the present invention to provide a relatively oil-free proteinaceous composition.

Another object is to provide such a composition which is also relatively colorless.

Another object is to provide such a composition which is much reduced in "feedy" flavor with respect to the gluten from which it is prepared.

Another object is to provide an efficient process for the preparation of prolamines from gluten.

These and other objects are accomplished by the present invention wherein gluten is extracted with substantially anhydrous methanol. A mixture of gluten and methanol is prepared, the mixture containing less than about 10% water based on methanol, and then separated to yield a relatively oil-free proteinaceous material. This material is suitable for use in human food compositions, particularly in sausage and weiner formulations where it is effective as a binder material. It is also useful in hamburger formulations and in bread formulations.

The relative proportions of methanol and gluten will vary depending upon the particular type of separation means employed. As little as three parts of methanol per part of gluten may be employed and, on the other hand, as much as 20 or 30 parts may thus be employed. All parts and percentages herein, unless otherwise expressly stated, are by weight.

The means of separation of methanol from gluten is not critical and may be either countercurrent extraction or batch extraction. A particularly desirable means is that afforded by a cyclone separator, because relatively small amounts of methanol are thus required. Where a batch method of separation is employed, i.e., filtration or centrifugation, it is necessary to use larger amounts of methanol ranging up to as much as 20 to 30 parts per part of gluten. In such instances, it is ordinarily desirable to use about 10 parts of methanol and then to wash the filter cake or solid centrifugate with an additional 10 parts of methanol; sometimes two washes are desirable. In still other instances, it is advisable to re-slurry the filter cake with fresh methanol and then to filter it again.

The time of contact between gluten and methanol is not critical and will depend upon the particle size of the gluten. That is, the more finely divided the gluten, the less time required for contact with methanol to effect efficient extraction. Ordinarily, the two are contacted for about 10 minutes and it is unnecessary to extend the time of this step beyond 15 minutes. Where the extracting mixture contains a relatively large proportion of water, e.g., 8–10%, then the time of contact should be short so as to minimize losses of prolamine via solution in the watery methanol.

The effectiveness of methanol is surprising in view of the relative ineffectiveness of other low molecular weight alcohols. A comparison of the results of extraction of corn gluten by several low molecular weight alcohols is shown in Table I.

TABLE I.—EFFICIENCY OF VARIOUS SOLVENTS IN DEOILING GLUTEN

| Extraction conditions | Oil in residue meal (percent) | Protein lost (percent of total) | Extract color (432 M) | Color of residue | Flavor of residue |
| --- | --- | --- | --- | --- | --- |
| 1........ None—Flash-dried gluten.................................... | 6.0 | | 1.22 | White..... | Bland. |
| 2........ Methanol—Cake washed with equal volume................ | 0.6 | 1.0 | 0.48 | Yellow.... | Feedy. |
| 3........ Ethanol—Cake washed with equal volume................. | 1.1 | 0.2 | 0.14 | ...do...... | Do. |
| 4........ Hexane—Cake washed with equal volume................. | 2.1 | | | ...do...... | Do. |
| 5........ Hexane—Reslurried 3 times and cake washed each time... | 2.0 | | | ...do...... | Do. |

In each of Nos. 2, 3 and 4 above, gluten was extracted via a batch process with 9 parts of methanol, ethanol and hexane, respectively, filtered, and the filter cake washed with 9 parts of fresh methanol. In No. 5, gluten was extracted with 9 parts of hexane, filtered, and the filter cake reslurried with an additional 9 parts of fresh hexane. This reslurrying step was repeated two more times, i.e., a total of 36 parts of hexane was used.

It will be noted that the flash-dried gluten contained 6.0% of oil whereas the methanol-extracted gluten contained but 0.6% of oil, 90% of the oil having been removed by such extraction. Furthermore, the extractions with ethanol and hexane were much less effective than the methanol extraction, producing gluten products having 1.1%, 2.1% and 2.0% of oil. Still further, it will be seen that only the methanol extraction yielded a product having a white color and a bland flavor. The others all gave a yellow color and a feedy flavor.

It is apparent that methanol has a unique solubilizing character with respect to the above undesirable constituents of gluten.

The temperature of the extraction is conveniently within the range of from about 15° C. to about 40° C. Temperatures above 40° C. permit the extraction of an undue amount of zein from the gluten and thus diminish the yield of desired oil-free proteins. Temperatures below 20° C. do not help in this respect and it is thus unnecessary to resort to cooling.

The water content of the extraction method is an important factor. Although zein and gliadin are prolamines and are thus soluble in aqueous alcohols, they are not sufficiently readily soluble in 90% aqueous methanol as to defeat the purposes of this invention. On the other hand, an extraction mixture containing more than 10% water is unsatisfactory because increasing amounts of zein are soluble in aqueous methanol as the proportion of water is increased beyond about 10%. Ordinarily, the gluten which is used as the raw material in the process contains about 10% moisture, but because the amount of methanol used is significantly greater than the amount of gluten used, this proportion of moisture in the gluten does not ordinarily become a factor in this regard. At the same time, if aqueous methanol is to be used as the solvent, then the moisture content of the gluten must be considered so as to keep the overall water content of the extracting mixture below about 10%. In a preferred embodiment, the water content of the extracting mixture is less than about 5% based on methanol. Particularly preferred is the use of 100% methanol and a gluten containing about 10% of water.

A preferred embodiment contemplates the use of an aqueous slurry of gluten as a raw material. Such aqueous slurry is dewatered by extraction with methanol to an overall water content which brings it within the scope of the above limitations. The dewatering step must be carried out rapidly so as to minimize losses to prolamine by solution in the aqueous methanol.

The gluten may be derived from any known source including, principally, corn and wheat. Because the problems of flavor are more closely associated with corn gluten, the process is particularly effective where corn gluten is the gluten used as the raw material. The composition of a typical corn gluten is 60% protein, 6% oil, 24% starch and other carbohydrates and 10% water.

The preparation of an oil-free, colorless, bland gluten is shown below:

EXAMPLE 1

A slurry of 100 parts of a spray-dried corn gluten 97.4% of which passes through a 200-mesh sieve, and 900 parts of methanol is passed through a 5-stage cyclone separator at 25° C. The slurry product obtained at the 5th stage is centrifuged, then dried overnight in a vacuum oven at 60° C. The product is substantially colorless and oil-free and has a bland flavor.

The above oil-free gluten is useful as an emulsifying agent in sausage formulations, as illustrated by the following composition:

SAUSAGE

| | Percent |
| --- | --- |
| Fat | 30 |
| Water | 50 |
| Meat protein | 10 |
| Salt | 2 |
| Dextrose | 3 |
| Flavorings | 2 |
| Oil-free gluten product of Example 1 | 3 |

As noted earlier, another aspect of the invention is the preparation of prolamines from gluten. The method of preparation involves mixing the above oil-free gluten with aqueous methanol containing from about 10% to about 25% water, heating the resulting mixture at from about 110° C. to about 140° C. for from about 1 to about 5 minutes, separating an aqueous methanol extract from the solid residue at a temperature of from about 60° C. to about 140° C., and isolating a prolamine from said methanol extract.

A typical preparation of a prolamine by the above process is as follows:

EXAMPLE 2

A slurry of 300 parts of the oil-free product of Example 1 in 1500 parts of 85% aqueous methanol is stirred at 130° C. in a pressure vessel for two minutes, then cooled quickly to 60° C. and filtered. The filtrate is treated with five parts of 10N sodium hydroxide and heated with stirring at 100° C. for two minutes. This solution then is cooled, filtered, cooled further to −25° C. and neutralized by the addition, with continued stirring, of four parts of concentrated hydrochloric acid. The resulting slurry is cooled still further to −35° C. and filtered. The prolamine (zein) precipitate is washed with 85% aqueous methanol, then with 100% methanol, all at −35° C. Then the washed solid is warmed to room temperature and washed again with 100% methanol, then dried. The product is the desired zein.

The oil-free gluten may, as before, be any of the variously available glutens, e.g., from wheat or corn. In the case of wheat, the desired prolamine is gliadin; in the case of corn, it is zein. Where it is corn gluten, and the desired product is zein, isolation of the zein from the aqueous methanol extract may be carried out by known procedures, as indicated in the above patents, or certain novel techniques may be employed as described hereinafter.

Aqueous methanol solutions of zein tend to gel. Ordinarily, this tendency can be avoided by treating the aqueous methanol solution with alkali. We have found that by increasing the temperature at which such treatment ordinarily is effected we can decrease considerably the time required for such treatment. Where previously, it was thought necessary to treat an aqueous alcoholic solution of zein with about 2% of sodium hydroxide based on the amount of zein for 30 minutes at reflux temperature to accomplish the desired modification, the same result can be achieved by heating the same mixture at 100° C. for as short a time as two minutes. This represents a remarkable saving in time, and significantly less alkali can be used to achieve a satisfactory degree of modification, i.e., the aqueous methanol solution is rendered suitably immune to gelatinization. The "degree of modification" is reflected by the "salt point" value of the solution, a high salt point value representing a high degree of modification and a correspondingly high degree of immunity to gelatinization. Salt point is the ionic strength at which clouding occurs when a 1% solution of prolamine in 0.05N sodium hydroxide is titrated with a solution of 1.0N in sodium chloride and 0.05N in sodium hydroxide, at 25° C. It is determined according to the following formula:

$$\text{Salt Point} = \frac{\text{Titer in ml.}}{\text{Titer plus 25}} \text{ plus } 0.05$$

In addition to sodium hydroxide, either potassium hydroxide or calcium hydroxide may be used to accomplish the above desired modification.

Then, the modified aqueous methanol solution of zein may be neutralized with dilute hydrochloric acid and quenched in a large volume of water at 10° C. or, alternatively, the modified aqueous methanol solution is cooled to about −25° C., then neutralized with dilute hydrochloric acid to a pH of about 6, cooled further to about −35° C. and filtered. The temperature at which neutralization is effected in the latter alternative process is somewhat critical, too low a temperature resulting in an ultimately slow filtration rate and too high a temperature resulting in the formation of a gummy precipitate. The filtration at about −35° C. proceeds rapidly and yields a particulate precipitate. This may be washed at −35° C. with additional aqueous methanol so as to remove the salt formed on neutralization of the alkali. The zein then may be dewatered and dried by ordinary means such as flash drying so as to remove residual methanol and water.

In still another embodiment of the invention, the above precipitate, obtained at −35° C., is allowed to warm to about 30° C., at which point it is a viscous fluid. Then it is poured into a large volume of vigorously agitated cold (10° C. or lower) water whereupon it solidifies.

While the invention has been described in connection with specific embodiments thereof, it will be understood that it is capable of further modification, and this applilation is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A method for the preparation of a proteinaceous composition suitable for use as a food material comprising (1) preparing a mixture consisting essentially of gluten and methanol at a temperature of from about 20° C. to about 40° C., said mixture containing less than about 10% water, based on methanol, (2) separating said gluten from said methanol by means of countercurrent extraction, filtration or centrifugation, (3) mixing said gluten with aqueous methanol containing from about 10% to about 25% water, (4) heating the resulting mixture at from about 110° C. to about 140° C. for from about 1 to about 5 minutes, (5) separating an aqueous methanol extract from the solid residue at a temperature of from about 60° C. to about 140° C., and (6) isolating a prolamine from said aqueous methanol extract.

2. The method of claim 1 wherein the separation of gluten from methanol in step (2) is accomplished by means of countercurrent extraction.

3. The method of claim 1 wherein the gluten is corn gluten.

References Cited
UNITED STATES PATENTS

| | | | |
|---|---|---|---|
| 2,120,946 | 6/1938 | Swallen | 260—123 |
| 2,133,591 | 10/1938 | Swallen | 260—123 |
| 2,354,393 | 7/1944 | Manley et al. | 260—123 |
| 2,360,381 | 10/1944 | Walsh et al. | 260—123 |
| 2,801,235 | 7/1957 | Miley | 260—112 G |
| 2,801,236 | 7/1957 | Miley | 260—112 G |
| 3,100,710 | 8/1963 | Carlin | 99—107 |

JAMES R. HOFFMAN, Primary Examiner

U.S. Cl. X.R.
260—123; 426—430